(12) United States Patent
Geeslin (10) Patent No.: US 6,590,845 B2
(45) Date of Patent: Jul. 8, 2003

(54) METHODS FOR PROTECTING OPTICAL DISC MEDIA

(75) Inventor: Randy Geeslin, Longmont, CO (US)

(73) Assignee: Roxio, Inc., Santa Clara, CA (US)

( * ) Notice: Subject to any disclaimer, the term of this patent is extended or adjusted under 35 U.S.C. 154(b) by 308 days.

(21) Appl. No.: 09/728,734

(22) Filed: Nov. 30, 2000

(65) Prior Publication Data

US 2002/0064113 A1 May 30, 2002

(51) Int. Cl.[7] ................................................. G11B 7/00
(52) U.S. Cl. .................................. 369/53.21; 369/59.25
(58) Field of Search ........................... 369/53.37, 59.25, 369/53.21, 275.3, 47.12

(56) References Cited

U.S. PATENT DOCUMENTS 5,886,979 A * 3/1999 Moribe et al. ........... 369/53.25

* cited by examiner

Primary Examiner—Nabil Hindi
(74) Attorney, Agent, or Firm—Martine & Penilla, LLP (57) ABSTRACT

A method for setting protection states of optical disc media is provided. The method includes setting a first protection state for the optical disc media. A second protection state which is configured to replace the first protection state is then set for the optical disc media. After the second protection state is set, a third protection state which is configured to replace the second protection state is set for the optical disc media. The first protection state is configured to replace the third protection state. Thus, the method also includes reverting from the third protection state back to the first protection state. The reverting is configured to skip a transition through the second protection state. Furthermore, a user may cycle through the first protection state, the second protection state and the third protection state as the user deems necessary.

19 Claims, 5 Drawing Sheets

METHODS FOR PROTECTING OPTICAL DISC MEDIA

BACKGROUND OF THE INVENTION

1. Field of the Invention

This invention relates generally to the protection of optical discs, and more particularly to resetting protection states for optical discs.

2. Description of the Related Art

Consumers are relying more and more on computers in today's marketplace. As consumers increase their reliance on computers, they are increasingly demanding storage media having greater storage capabilities. In response to these demands, retailers have started manufacturing optical discs such as rewritable compact discs (CD-RW) that have increased storage capacity in comparison to other storage media. Optical discs store information on tracks that spiral around the center of the disc. The spiral contains sectors to which data is written and stored. After data is written to the optical disc, typically there is a need for protecting the information written to the disc.

The states of protection prevent the unauthorized alteration of data written to the optical disc. This includes preventing an unauthorized user from reading files stored on the optical disc and preventing an unauthorized user from writing additional files to the disc. Currently, protection states are limited to a hard write protect state. The hard write protect state prevents a user from writing additional data to an optical disc. Once the hard write protect state is engaged, all users are prevented from altering files stored on the optical disc. Nonetheless, this is undesirable because it severely limits the usability of an optical disc since a user is no longer able to store additional data to the optical disc. Also, with present protection state applications for optical discs, a user is only able to engage the protection state after the user is done using the disc.

Typically, as a user backs up files to an optical disc, the user writes files to the optical disc and engages a protection state after the user has completed writing data to the optical disc. Under this scheme, a user may not protect the optical disc immediately. For example, a user may be writing back-up files to an optical disc over a course of days. As such, the files remain unprotected during the days while the user continues to write additional data to the optical disc. Thus, a second user may access the optical disc and alter data written to the back-up disc.

This presents further problems to users connected over a network. A user writing files to an optical disc which is connected to a network may not protect the data as the user is writing it to an optical disc. As such, other users connected to the network may access the optical disc through the network and alter data stored on the optical disc until the user writing files protects the disc, which will not occur until the user is done writing data to the disc.

In addition, the present protection states do not allow a user to change the protection states of the optical disc. Once the hard write protect state is set, a user may not reset the protection state to a non-hard write protect state. Thus, the optical disc may no longer be written to and files contained on the optical disc may not be altered.

In view of the foregoing, there is a need for a method to write protect optical discs as a user is writing data to the optical disc. This new method should allow for different levels of protection on the optical disc and allow the user to reset the states of protection as the user deems necessary.

SUMMARY OF THE INVENTION

Broadly speaking, the present invention fills these needs by providing a method for setting the protection states of optical discs. It should be appreciated that the present invention can be implemented in numerous ways, including as a process, an apparatus, a system, a device, or a method. Several inventive embodiments of the present invention are described below.

In one embodiment, a method for setting protection states of an optical disc media is disclosed. The method includes initially setting a first protection state, then a second protection state and then a third protection state for the optical disc media. The second protection state is configured to replace the first protection state. The third protection state is configured to replace the second configuration state once the second protection state replaces the first protection state. The method also includes reverting from the third protection state back to the first protection state where the first protection state is configured to replace the third protection state. When the method reverts back to the first protection state, the second protection state is skipped.

In another embodiment, a method for protecting data of an optical disc media is disclosed. The method includes formatting the optical disc media where the formatting is configured to set a first protection state in a protection state byte of an implementation use volume descriptor. After the first protection state is set for the optical disc media, the protection state byte is written with a second protection state. The method also includes writing files which are configured to inherit the second protection state written to the protection state byte after the files are written to the optical disc media. Once the files are written to the optical disc, the protection state byte is written with a third protection state which may be replaced by the first protection state. The third protection state is replaced with the first protection state by writing the protection state byte with the first protection state after the protection state byte is written with the third protection state.

In still a further embodiment, a computer implemented method for protecting data written to optical disc media is disclosed. The method includes first formatting the optical disc to have a first protection state. Once the optical disc is formatted, the method determines if a change in the first protection state is requested. If the change in the first protection state is requested, the first protection state is changed to a second protection state. After the optical disc is changed to the second protection state, the method determines if a change in the second protection state is requested. If the change in the second protection state is requested, the second protection state is changed to a third protection state. The method also determines if a change in the third protection state is requested. If the change in the third protection state is requested, the method changes the third protection state to the first protection state without switching to the second protection state.

The many advantages of the present invention should be recognized. The present invention allows users to switch between different protection states of an optical disc. A user may switch from a hard write protection state for an optical disc to a no protection state. Also, the present invention provides protection of a file immediately after the file is closed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for a method of setting protection states for optical disc media is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention relates to protecting data stored on optical disc media. After data is written to an optical disc, it is often desirable to prevent unauthorized access to the data by placing protections on the optical disc. These protections are referred to as protection "states" and offer different levels of protection. In one embodiment of the present invention, there are three protection states, a "no protection" state, a "write protection" state and a "disc protection" state. In the no protection state, users are able to read from and write to the optical disc.

The write protection state allows users to read data stored on an optical disc but prevents writing to the optical disc. When the optical disc is in the write protection state, as soon as a file is closed, files written to a session are automatically write protected. In the write protection state, a file may not be modified, deleted, or moved until the optical disc is taken out of the write protection state.

The disc protection state restricts read and write access to the optical disc such that a user may not read data stored on the optical disc nor may a user write to the optical disc. The disc protection state is set when files are not being written to the optical disc and all files are closed.

Figure 1A:
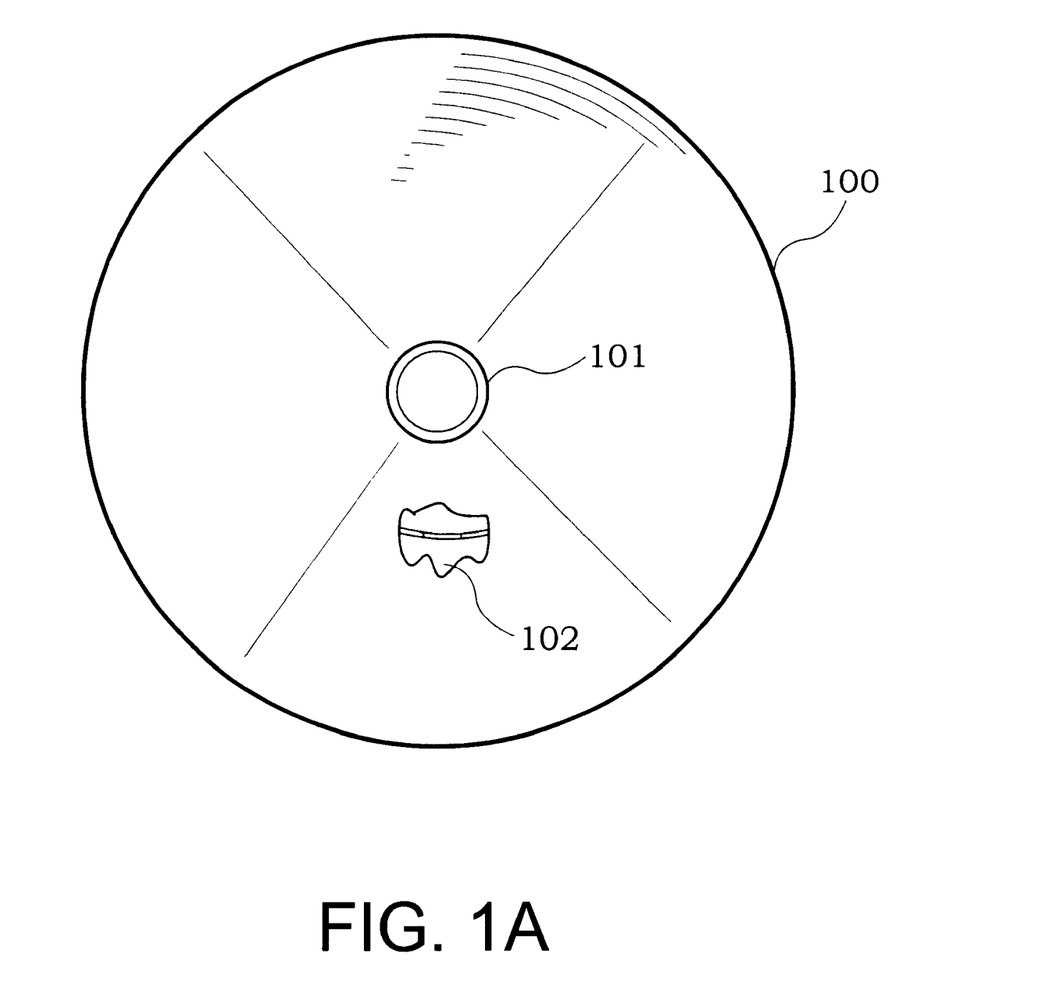
FIG. 1A illustrates an optical disc in accordance with one embodiment of the present invention.

Now making reference to FIG. 1A, FIG. 1A illustrates an optical disc 100 having sectors 102 in accordance with one embodiment of the present invention. The optical disc 100 may be any type of optical storage media such as a recordable compact disc (CD-R) or a rewritable compact disc (CD-RW). The optical disc 100 stores user data written to the optical disc 100 using any suitable technique, such as with an optical disc recorder (not shown). When the optical disc 100 is initially inserted into the disc drive, sectors, such as the sectors 102, are configured in a spiral orientation around a center 101 of the optical disc 100. As data is written to the optical disc 100, the data is stored on the sectors 102. In one embodiment, data is written to the sectors 102 in the form of files which contain the data.

Figure 1B:
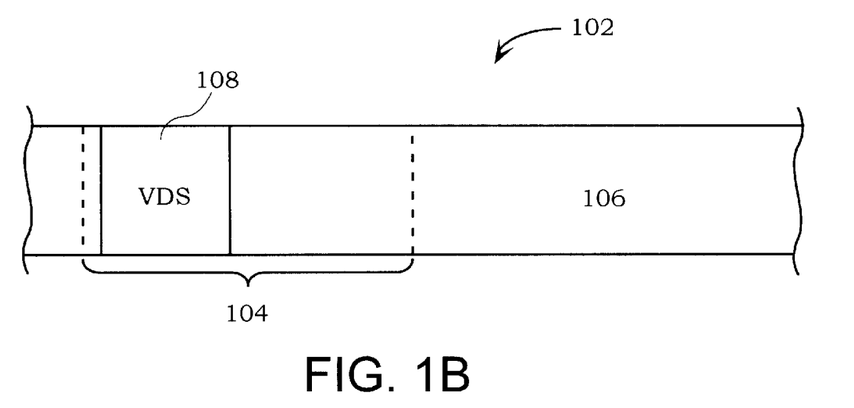
FIG. 1B shows a volume descriptor sequence in sectors of an optical disc, in accordance with one embodiment of the present invention.

FIG. 1B shows a volume descriptor sequence (VDS) 108 in the sectors 102 of the optical disc 100, in accordance with one embodiment of the present invention. The sectors 102 contain a user data area 106 and a file system area 104. The user data area 106 is made up of sectors 102 that contain data written to the sectors 102 by a user. The file system area 104 is a data structure that contains information about files stored on the optical disc 100, such as file location. The file system area 104 also includes the volume descriptor sequence 108. The volume descriptor sequence 108 includes data and identifiers about the volume on the optical disc 100. The volume descriptor sequence 108 also includes an implementation use volume descriptor (IUVD) 110, as shown with reference to FIG. 1C.

Figure 1C:
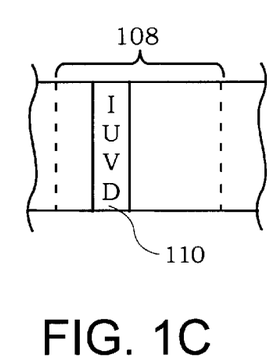
FIG. 1C is an embodiment of the present invention showing an implementation use volume descriptor contained in a volume descriptor sequence.

FIG. 1C is an embodiment of the present invention showing the implementation use volume descriptor 110 contained in the volume descriptor sequence 108. The implementation use volume descriptor 110 identifies the application or implementation that prepared the volume and any special attributes applied to the volume by that application or implementation. Also located in the volume descriptor sequence 108 is a protection state byte (PSB) 112, as shown with reference to FIG. 1D.

Figure 1D:
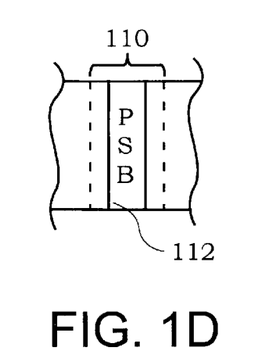
FIG. 1D shows a protection state byte located in an implementation use volume descriptor in accordance with one embodiment of the present invention.

FIG. 1D shows the protection state byte 112 located in the implementation use volume descriptor 110. The protection state byte 112 indicates the protection state of the optical disc 100. In one embodiment of the present invention, the optical disc 100 may have the three protection states as described above. For example, if the optical disc 100 is in the write protection state, the protection state byte 112 indicates that this is the current protection state of the optical disc 100. Thus, when the optical disc 100 is placed into a disc drive (not shown), the the protection state byte 112 is read to ascertain that the optical disc 100 is currently in the write protection state.

The protection state of the optical disc is changed by changing the bit configuration of the protection state byte 112. For example, in one embodiment, the first protection state may comprise bits that are set to "0" in the protection state byte 112. On the other hand, the second protection state may be configured in this example such that one bit in the protection state byte 112 is set to a "1" while the remaining bits in the protection state byte 112 are set to a "0". Thus, when an optical disc is in the first protection state, the bits in the protection state byte 112 are set to "0". In order to change the optical disc from the first protection state to the second protection state, one bit in the protection state byte 112 must be set from a "0" to a "1" while the other bits remain set to a "0".

Figure 1E:
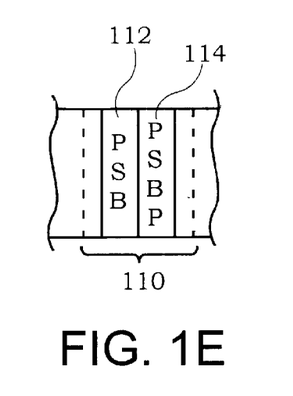
FIG. 1E is an alternative embodiment of the present invention illustrating a protection state byte password located in an implementation use volume descriptor.

FIG. 1E is an alternative embodiment of the present invention illustrating a protection state byte password (PSBP) 114 located in the implementation use volume descriptor 110. In this embodiment, the protection state of the optical disc 100 is password protected. Thus, in order for a user to change the protection state of the optical disc 100, in addition to changing the protection state byte 112, the user must provide a password which matches the password stored in the protection state byte password 114. In one embodiment, the password may be encrypted to provide a further level of protection. In an alternative embodiment, separate passwords may be required for different protection states. Thus, in the alternative embodiment, the password required for the write protection state would be different than the password required for the disc protection state.

Figure 2:
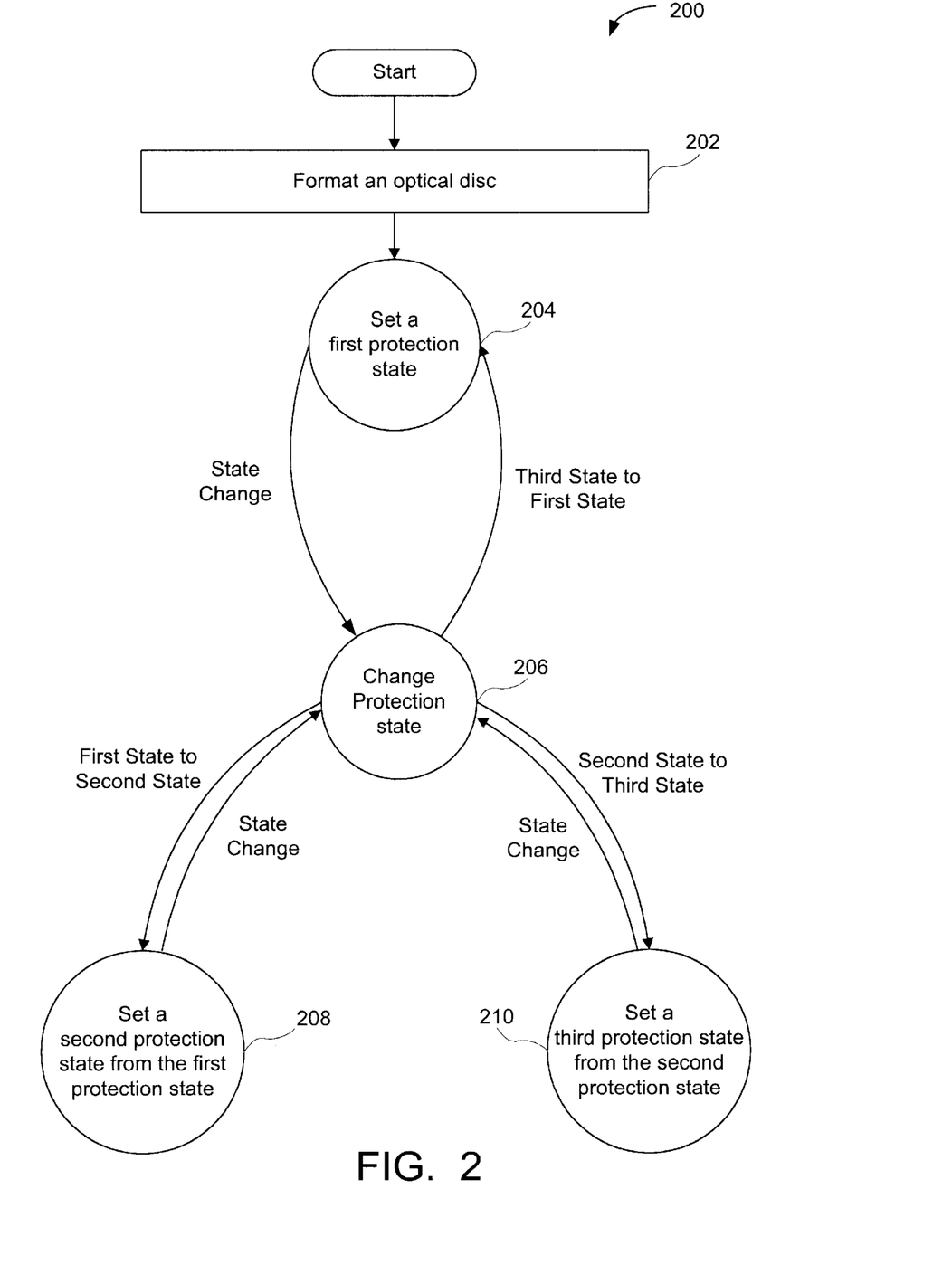
FIG. 2 is illustrates a state machine for changing protection states of an optical disc in accordance with one embodiment of the present invention.

FIG. 2 illustrates a state machine 200 in accordance with one embodiment of the present invention. In the state machine 200, an optical disc is first placed into a disc drive and formatted in operation 202. For example, turning to FIG. 1A, during the formatting operation 202, a track is established on the optical disc 100 and sectors, such as the sectors 102, are established on the optical disc 100. During the formatting operation 202, the file system area 104 and the volume descriptor sequence 108 are also established on the sectors 102 of the optical disc 100 as shown with reference to FIG. 1B. Also established during the formatting operation 202 is the implementation use volume descriptor 110 which contains the protection state byte 112 and the protection state byte password 114 in FIG. 1E. After the formatting operation 202 is complete, the state machine 200 moves to operation 204.

Referring back to FIG. 2, in operation 204, a first protection state is set on the optical disc. In one embodiment, the first protection state is automatically set during the formatting operation 202. The protection state is set on the optical disc by writing bits to a sector on the optical disc indicating the change in protection state. In one embodiment of the present invention, the first protection state on the optical disc is the no protection state discussed earlier. Referring back to the example, after the optical disc 100 is formatted, the optical disc 100 is set to the first protection state, which in this example is the no protection state. The optical disc 100 is set to the no protection state by changing the bit configuration of the protection state byte 112 as discussed with reference to FIG. 1D. Thus, as a disc drive reads the sector 102 and the protection state byte 112, the disc drive knows that the optical disc 100 is currently set to the no protection state. Also in this example, a password is set in the protection state byte password 114 in FIG. 1E. As such, when a user desires to change the protection state of the optical disc 100, a password must be entered which matches the password stored on the protection state byte password 114. Referring back to FIG. 2 and the state machine 200, once the first protection state is set for the optical disc in operation 204, a user has the option of changing the protection state from the first protection state to a second protection state in operation 206.

Operation 206 is performed for all changes in protection state. Thus, if the optical disc is in a third protection state and a user desires to change to the first protection state, the operation 206 is performed to change the protection state of the optical disc from the third protection state to the first protection state. Turning back to the example, after the optical disc 100 is initialized (formatted) and set to the no protection state in operation 204, the user desires to change the protection state from no protection state to the write protection state. Therefore, the state machine 200 moves to operation 206 and proceeds to change the protection state of the optical disc 100. However, before the protection state of the optical disc 100 is changed, the user must enter a password which matches the password stored on the protection state byte password 114. Once the proper password is input, the protection state is set to the write protection state from the no protection state in operation 208 of the state machine 200, as shown with reference to FIG. 2.

Referring back to FIG. 2, in operation 208 the second protection state is set from the first protection state. The second protection state is set in operation 208 in the same manner as the first protection state was set in operation 204. In one embodiment of the present invention, the second protection state is the write protection state mentioned earlier. The second protection state is engaged by changing the bit configuration in the protection state byte 112 as described with reference to FIG. 1D. Returning back to the example, the protection state of the optical disc 100 is changed from the no protection state to the write protection state in the operation 208. When the protection state is changed, the protection state byte 112 in FIG. 1D is changed as described in operation 204. Thus, when a disc drive reads the optical disc 100, it will know that the optical disc 100 is currently set to a write protection state. Turning back to FIG. 2, after the second protection state has been set in operation 208, the user has the option of changing the protection state in operation 206 to a third protection state.

Once the second protection state has been changed to the third protection state in operation 206, the state machine 200 moves to operation 210 to set the third protection state. The third protection state is set in the same manner as the first and second protection states as previously described. In one embodiment of the present invention, the third protection state is the disc protection state. Referring back to the example, when a user decides to change the protection state of the optical disc 100, the protection state is changed in operation 206. However, as previously described, all files must be closed before the disc protection state is set. Thus, prior to changing the protection state byte 112 and entering the proper password that matches the protection state byte password 114, the user must close all files on the optical disc 100. After all the files are closed and the protection state is changed in operation 206, the disc protection state will be set in operation 210.

After the third protection state is set in operation 210 of the state machine 200, a user has the option of changing the protection state back to the first protection state. A user may decide at a later time to modify existing files, add new files, delete or move files on the optical disc. In order to access, modify, add, delete, or move files on an optical that has been set to the third protection state, the protection state must be changed to the first protection state. The state machine 200 changes the third protection state back to the first protection state in operation 206 and sets the first protection state in operation 204 of the state machine 200. It should be noted that the operations 206, 208 and 210 may be repeated numerous times in order to change the protection state of the optical disc as the user deems necessary.

Figure 3:
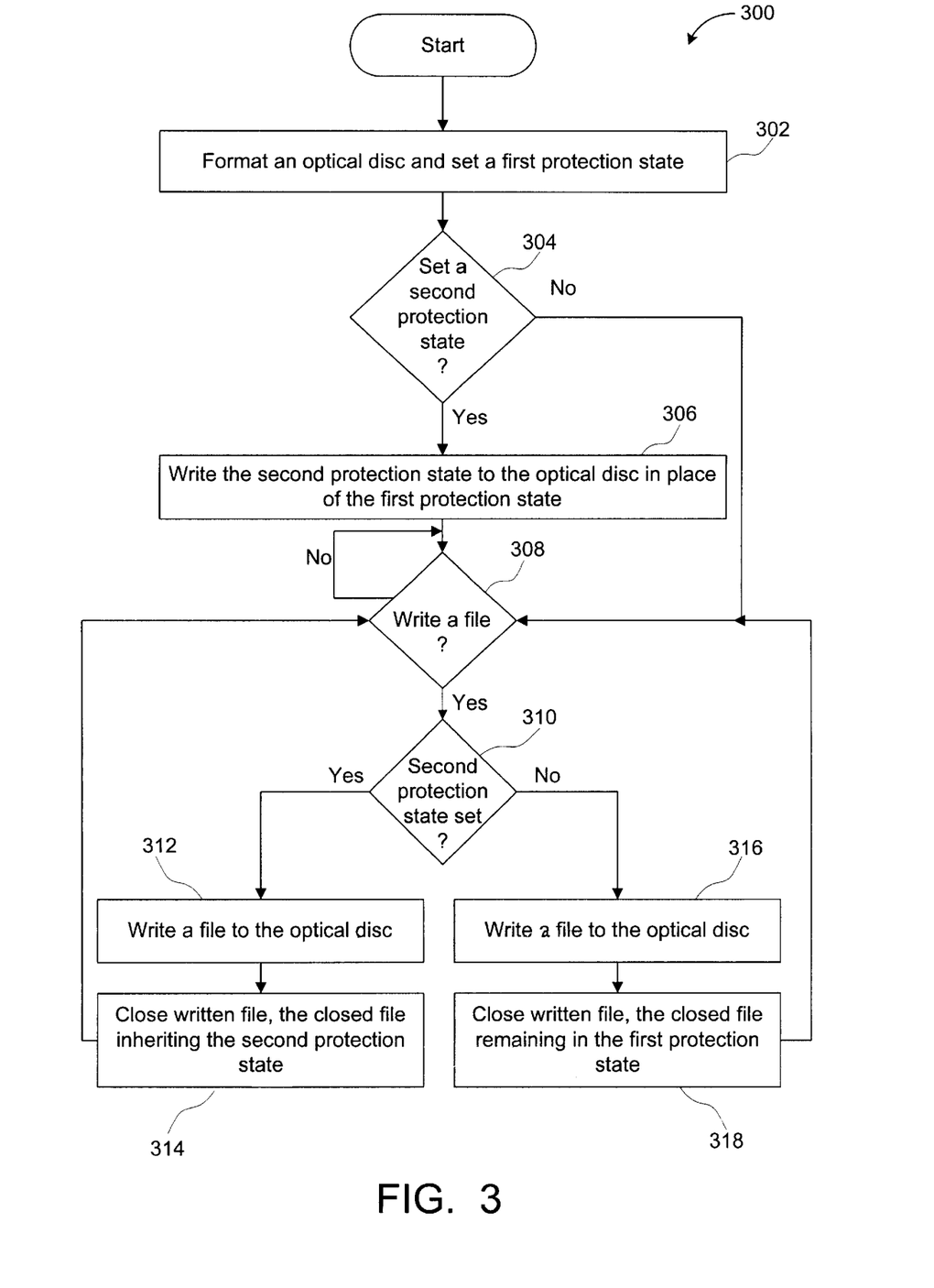
FIG. 3 is a flowchart illustrating a method of writing files to an optical disc in the no protection state and the write protection state, in accordance with one embodiment of the present invention.

FIG. 3 is a flowchart illustrating a method 300 of writing files to an optical disc in the no protection state and the write protection state, in accordance with one embodiment of the present invention. In operation 302, an optical disc is placed into a disc drive, and formatted. During the operation 302, the optical disc is automatically set to a first protection state. For example, the optical disc 100 of FIG. 1A is inserted into a disc drive (not shown) and formatted. When the optical disc 100 is formatted, the first protection state is set by writing to the protection state byte 112 as described in operation 204 of FIG. 2.

Referring back to FIG. 3, once the optical disc has been formatted, the method 300 moves to operation 304 where a user has the option of setting a second protection mode. If the user decides to set a second protection state, the method moves to operation 306. If the user decides not to set a second protection mode, the method 300 moves to operation 308, which will be discussed in greater detail below.

In operation 306, the second protection state is written to the optical disc in place of the first protection state in the same manner described before. In this embodiment, the second protection state is the write protection state as previously described. Referring back to the example, the user decides to set a second protection state in operation 304. Therefore, the write protection state is written to the optical disc 100 at the protection state byte 112 in operation 306. The write protection state is written after the user enters the proper password that matches the password written to the protection state byte password 114. After the write protection state is written to the optical disc 100 in operation 306, the method 300 moves to operation 308 in FIG. 3 where the method determines if a file is being written to an optical disc. The method 300 remains at operation 308 until a file is written to the optical disc. Once a file is written to the optical disc, the method 300 moves to operation 310.

In operation 310, the method 300 determines if the second protection state is set. If the second protection state is set, the method 300 moves to operation 312. If the second protection state is not set, the method 300 moves to operation 316. In operation 312, a file is written to the optical disc. After the file is written to the optical disc, operation 314 is performed, where a file is closed and the closed file inherits the second protection state. Thus, when a file handle is closed, and the operating system recognizes the file as a closed file, the file is write protected and users may only access, re-open, the file in read-only mode. Turning back to the example, when the user writes a file to the optical disc 100 in operation 308, the method 300 moves to operation 310. In operation 310, the method 300 determines that the protection state byte 112 in FIG. 1D is set for the write protection state. As such, the method 300 proceeds to operation 312 where the user writes a file to the optical disc 100. Once the user is done writing to the file, the user closes the file and the closed file is automatically write protected. In an embodiment of the invention, a user can close a session. By closing a session, any open file in the session is closed, and all files thus closed inherit the protection state. Thus, the user may continue to write other files to other sessions of the optical disc and not worry about unauthorized users gaining access to files written to the optical disc that have been closed. This feature is particularly useful in a networking environment where an optical disc being used may be accessible by other users also on the network. In the past, files on the optical disc were accessible by unauthorized users on the network until the user finished working with the optical disc because the write protect was not engaged until the user was done working on the optical disc. In this embodiment of the present invention, as the user closes a file, the file becomes write protected while the user is writing other files to the optical disc.

Referring back to FIG. 3 and the operation 310, if the method 300 determines that the second protection state was not set in operation 304, the method 300 moves to operation 316 where a file is written to the optical disc. After the file is written to the optical disc in operation 316, the written file is closed in operation 318 and the closed file remains in the first protection state. The first protection state of the closed file and optical disc may be changed to the second protection state and the third protection state at a later time as will be further described with reference to FIG. 4.

Figure 4:
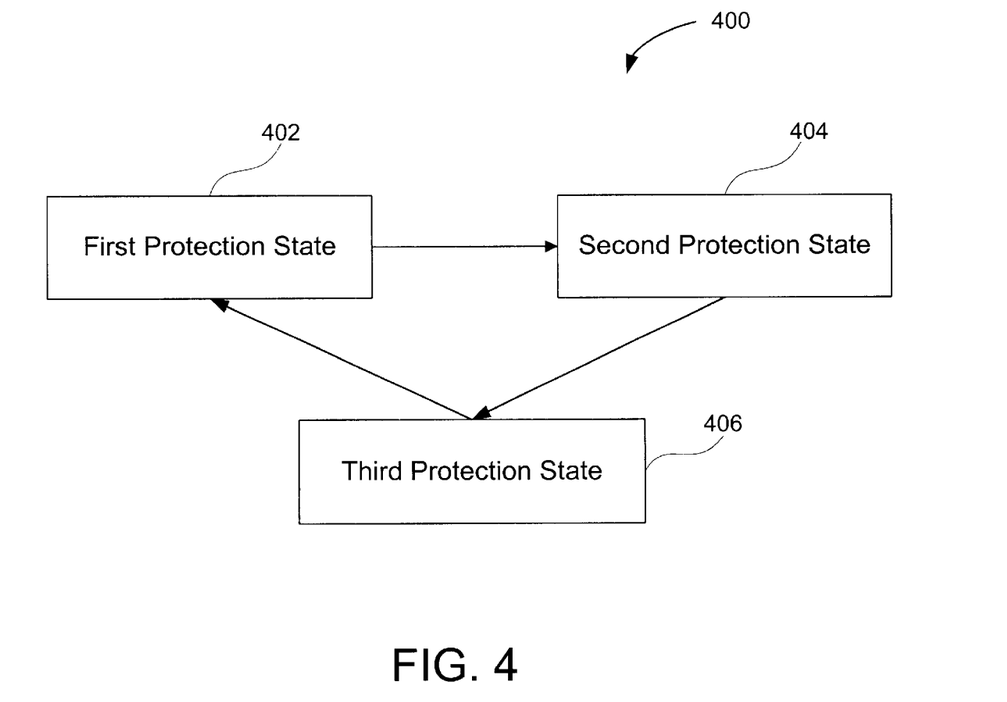
FIG. 4 is a flowchart showing the protection states of the present invention in accordance with one embodiment.

FIG. 4 is a flowchart 400 showing the protection states of the present invention in accordance with one embodiment.

As described with reference to FIGS. 2 and 3, an optical disc starts in the first protection state 402 when it is formatted. If the user desires to change the protection state, the user may place the optical disc in the second protection state 404 using either the state machine 200 or the method 300 described with respect to FIGS. 2 and 3. Once the optical disc is in the second protection state, the user may then place the optical disc in a third protection state 406 again using the state machine 200. If the user later decides that files stored on the optical disc must be modified or additional files added after setting the third protection state, the user may change the optical disc from the third protection state 406 back to the first protection state 402 using the state machine 200 as described with reference to FIG. 2. As shown in FIG. 4, in one embodiment of the present invention, the protection states available for the optical disc cycle through protection states. Thus, if an optical disc is in the second protection state 404 and a user desires to place the optical disc into the first protection state, the user first cycles through the third protection state before placing the optical disc in the first protection state.

The present invention provides many benefits to users. These benefits include the flexibility of switching the protection states of an optical disc and the ability to place an optical disc in a write protection state while allowing the user to continue writing additional files to the optical disc. As previously stated, in the past users could not change the protection state of an optical disc after it was placed in a hard write protect state. The present invention allows the flexibility of removing a hard write protect on an optical disc once the optical disc has been hard write protected in order to modify existing files. Thus a user may protect an optical disc after writing files and then remove the protection when the user desires to modify existing files or add new files.

The present invention also allows write protection on the fly. As described above, a file is automatically write protected when the file is closed if the disc is in the write protection state. Thus, users on a network do not have to worry about unauthorized users accessing files while the user is working with other files on the optical disc.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for setting protection states of an optical disc media, comprising:

setting a first protection state for the optical disc media;

setting a second protection state for the optical disc media, the second protection state being configured to replace the first protection state;

setting a third protection state for the optical disc media, the third protection state being configured to replace the second protection state; and reverting from the third protection state to the first protection state, the first protection state being configured to replace the third protection state, the reverting being configured to skip a transition through the second protection state.

2. A method for setting protection states of an optical disc media as recited in claim 1, wherein the optical disc media inherits the second protection state after a session of writing is closed.

3. A method for setting protection states of an optical disc media as recited in claim 1, wherein the second protection state prevents writing to files on the optical disc media.

4. A method for setting protection states of an optical disc media as recited in claim 1, wherein the third protection state prevents reading of files on the optical disc media, prevents writing to the files on the optical disc media and prevents writing additional files to the optical disc media.

5. A method for setting protection states of an optical disc media as recited in claim 1, wherein the second protection state and the third protection state are password protected.

6. A method for setting protection states of an optical disc media as recited in claim 1, wherein the first protection state allows a user to read the optical disc media and allows the user to write to the optical disc media.

7. A method for setting protection states of an optical disc media as recited in claim 2, wherein a user may write files to other sessions of the optical disc media after the session inherits the second protection state.

8. A method for protecting data of an optical disc media, comprising:

formatting the optical disc media, the formatting being configured to set a first protection state in a protection state byte of an implementation use volume descriptor;

writing the protection state byte with a second protection state;

writing files to the optical disc media, the files being configured to inherit the second protection state;

completing the writing of the files to the optical disc media;

writing the protection state byte with a third protection state; and writing the protection state byte with the first protection state, the writing of the first protection state being after the writing of the third protection state.

9. A method for protecting data of an optical disc media as recited in claim 8, wherein the first protection state allows reading from the optical disc media and allows writing to the optical disc media.

10. A method for protecting data of an optical disc media as recited in claim 8, wherein the second protection state allows reading from the optical disc media but prevents writing to files of the optical disc media.

11. A method for protecting data of an optical disc media as recited in claim 8, wherein the third protection state prevents reading from the optical disc media and prevents writing to the optical disc media.

12. A method for protecting data of an optical disc media as recited in claim 8, wherein the second protection state and the third protection stat e are password protected.

13. A method for protecting data of an optical disc media as recited in claim 8, wherein the files inherit the second protection state when a file handle is closed for a session.

14. A method for protecting data of an optical disc media as recited in claim 13, wherein a user may write files to other sessions after the file handle is closed for the session.

15. A computer implemented method for protecting data of an optical disc media, comprising:

formatting the optical disc media to have a first protection state;

determining if a change in the first protection state is requested;

if the change in the first protection state is requested, changing the first protection state to a second protection state;

determining if a change in the second protection state is requested;

if the change in the second protection state is requested, changing the second protection state to a third protection state;

determining if a change in the third protection state is requested; and if the change in the third protection state is requested, changing the third protection state to the first protection state without switching to the second protection state.

16. A computer implemented method for protecting data of an optical disc media as recited in claim 15, wherein the first protection state allows reading of files on the optical disc media and writing to the optical disc media.

17. A computer implemented method for protecting data of an optical disc media as recited in claim 15, wherein the second protection state allows reading of files from the optical disc media and prevents writing to the files on the optical disc media.

18. A computer implemented method for protecting data of an optical disc media as recited in claim 15, wherein the third protection state prevents reading of files from the optical disc media and prevents writing to the optical disc media.

19. A computer implemented method for protecting data of an optical disc media as recited in claim 15, wherein a file inherits the second protection state when a session is closed.

* * * * *